(12) United States Patent
Chow et al.

(10) Patent No.: US 6,436,167 B1
(45) Date of Patent: Aug. 20, 2002

(54) SYNTHESIS OF NANOSTRUCTURED COMPOSITE PARTICLES USING A POLYOL PROCESS

(75) Inventors: Gan-Moog Chow, Bowie, MD (US); Lynn K. Kurihara; Paul E. Schoen, both of Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1115 days.

(21) Appl. No.: 08/645,397

(22) Filed: May 13, 1996

(51) Int. Cl.[7] .................................................. B22F 1/00
(52) U.S. Cl. .............................. 75/371; 75/370; 75/343
(58) Field of Search ........................... 75/371, 370, 343

(56) References Cited

U.S. PATENT DOCUMENTS 3,965,046 A * 6/1976 Deffeyes ..................... 252/472
4,539,041 A * 9/1985 Figlarz et al. ................. 75/0.5
4,615,736 A * 10/1986 Armor et al. .................. 75/251
5,632,824 A * 5/1997 Grenthe et al. ............. 148/237

* cited by examiner

Primary Examiner—M. Alexandra Elve
(74) Attorney, Agent, or Firm—John J. Karasek; Jane B. Barrow

(57) ABSTRACT

The present invention is a polyol method for making composite particles of two or more immiscible transition metals, where these particles are of nanoscale dimensions, and where the constituent metals are of essentially nanocrystalline morphology. The method of the invention has the steps of (1) dissolving or suspending two or more precursor metal compounds in an alcohol or polyol (diol, triol, etc.) solution, and (2) taking the solution or suspension to a temperature where the metal compound reduces, causing the first and second metals to form nanoscale composites. The term "polyol solution" will be used herein to describe solutions that contain either alcohol or polyol.

26 Claims, 5 Drawing Sheets

SYNTHESIS OF NANOSTRUCTURED COMPOSITE PARTICLES USING A POLYOL PROCESS

BACKGROUND OF THE INVENTION

1. Field of the Invention

The present invention relates to finely-scaled (nanoscale) metal/metal composites, and methods for making them. More particularly, the invention relates to making finely-scaled metal/metal composites by a polyol process. These composites may be in the form of powders, films, aggregates, and other desired morphologies.

2. Description of the Related Art

Nanoscale particles have dimensions in the approximate range 1–100 nm. Because of size confinement effects in these particles, and because the high surface-to-volume ratios in these particles (resulting in high surface effect levels), these particles frequently have properties that differ markedly from the properties of identical materials of larger particles.

Several methods exist for the preparation of nanoscale particles, including vapor deposition, solid-state milling, and solution chemistry. Chemical routes for fabricating nanoscale particles have the following attractive features: the ability to tailor design of materials at the molecular level, the ability to control particle size and distribution, the stabilization of particles against undesirable agglomeration, and cost effective production of large batches of many materials.

A chemical process (referred to as the polyol process) for the synthesis of finely dispersed single element metallic particles in the micron and submicron size regime has been developed recently. This process entails dissolving or suspending a metallic compound in a polyol, and taking the solution or suspension to a temperature where the compound is reduced and the metal precipitates out. Size of the particles can be controlled by, inter alia, controlling the reaction temperature, reaction pH, concentration of polyol or precursors, concentration of nucleation agents, and other reaction variables. Several of these factors will affect the nucleation rate. Higher nucleation rates will tend to limit particle size.

Bimetallic and multimetallic nanocomposites are desired for a number of applications, including magnetic recording and GMR applications. Methods are known for making bimetallic and multimetallic composites. For example, one known method entails the preparation of a metastable solid solution (e.g., by vapor deposition) of immiscible elemental metals, and then annealing that solution to cause phase segregation. This yields a nanocomposite with single domain magnetic particles. However, the methods of making these metastable solid solutions are typically costly (e.g., vapor deposition), as is the subsequent annealing step. Moreover, annealing can degrade the properties of many substrates, including Si substrates. Si tends to oxidize under annealing conditions.

Vapor deposition is useful for film deposition, but will not be cost effective for producing bulk powders. Conversely, mechanical alloying is limited to powder production. Accordingly, it is desired to provide a method that is flexible enough to prepare materials of either morphology, i.e., film or powder.

Another method entails using $H_2$ to reduce metal hydroxides. This method also requires reaction temperatures of several hundred degrees Celsius to reduce the hydroxides to their constituent metals.

Another method entails aqueous borohydride reduction of metal salts. Unfortunately, boron was inevitably incorporated as an impurity in these materials.

SUMMARY OF THE INVENTION

Accordingly, it is an object of this invention to make nanoscale multi-metal composites, including bimetallic, trimetallic, and polymetallic composites.

It is a further object of this invention to make these composites essentially boron free.

It is a further object of this invention to make these composites with desirable morphology, such as powders and films (including thin films and thin film multilayers).

It is a further object of this invention to make these composites at relatively low temperatures.

It is a further object of this invention to make metal composite powders and films with desirable magnetic properties (e.g., high coercivity, exhibiting GMR, etc.).

It is a further object of this invention to make metal composite films on a variety of substrates.

These and additional objects of the invention are accomplished by the structures and processes hereinafter described.

The present invention is a polyol method for making composite particles of two or more immiscible transition metals, where these particles are of nanoscale dimensions, and where the constituent metals are of essentially nanocrystalline morphology. The method of the invention has the steps of (1) dissolving or suspending two or more precursor metal compounds in an alcohol or polyol (diol, triol, etc.) solution, and (2) taking the solution or suspension to a temperature where the metal compound reduces, causing the first and second metals to form nanoscale composites. The term "polyol solution" will be used herein to describe solutions that contain either alcohol or polyol.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1A:
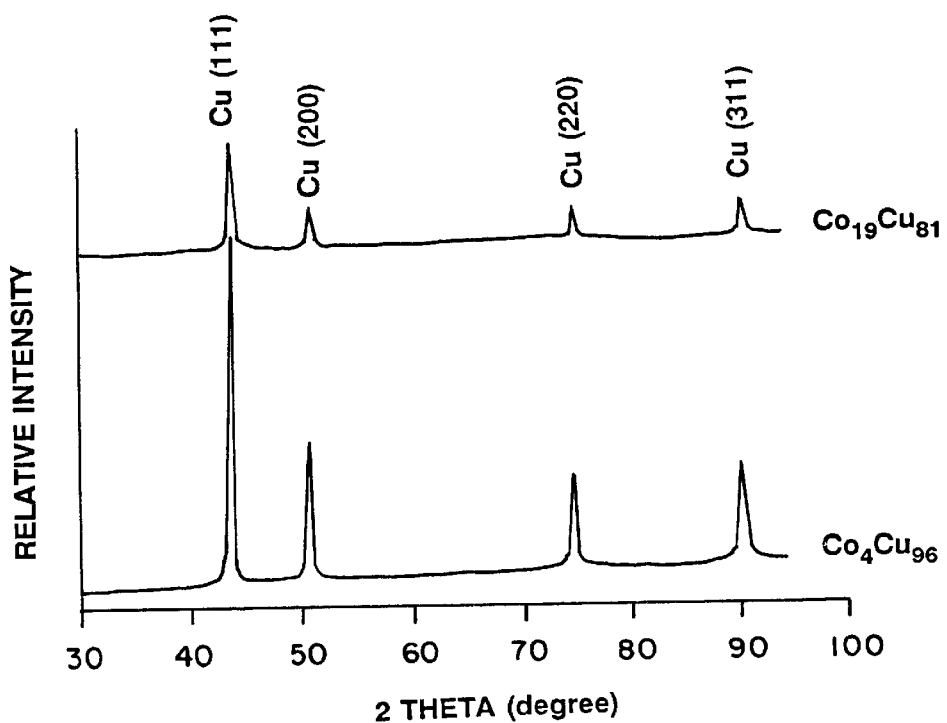
FIGS. 1a and 1b show the x-ray diffraction patterns for as-synthesized $Co_xCu_{100-x}$ (x=at %) samples.

G. M. Chow et al., "Structural, morphological, and magnetic study of nanocrystalline cobalt-copper powders synthesized by the polyol process", *J. Materials Research* 10 (6) pp. 1546–54 (1995) is incorporated by reference herein, in its entirety, for all purposes.

U.S. Pat. No. 5,470,373, "Oxidation Resistant Copper", issued Nov. 28, 1995 to A. S. Edelstein et al., is incorporated by reference herein, in its entirety, for all purposes.

U.S. patent application Ser. No. 08/565,488, Navy Case No. 76,572, "Nanostructured Metallic Powders and Films via an Alcoholic Solvent Process", filed Nov. 30, 1995 by G. M. Chow et al., is incorporated by reference herein, in its entirety, for all purposes.

The metallic composites of the invention will have a matrix of a first metal, containing nanoscale particles of at least one additional metal. Each of the metals will have a nanocrystal-line structure. In composites where the metal constituents are present in roughly equal proportions, the identification of a matrix metal is arbitrary. These composites may be prepared in the form of, e.g., thin films and powders. In the case of powder composites, these powders are collected as precipitates after the reaction has been run. In the case of thin films, the reaction is run with an appropriate substrate in the solution. As the reaction runs, the nanoscale composite particles will bind to the substrate, either by precipitating out of solution and adhering to the substrate, or by nucleating and growing on the substrate, or by a combination of these mechanisms. The substrate, the coated substrate may be collected after the reaction has run.

Most metals are immiscible with at least one other metal, so most metals will be useful in the present invention. Metals which may be part of a metal containing precursor compound according to the present invention typically include all of the group IIIA through group IIIB metals (more typically all of the group IVA through group IIIB metals), exclusive of Cd (and perhaps Ti). Suitable metal compounds include at least compounds of cobalt, copper, silver, gold, palladium, platinum, iridium, osmium, nickel, lead, cadmium, vanadium, chromium, manganese, niobium, molybdenum, ruthenium, rhodium, indium, tin, tantalum, tungsten, rhenium, and iron.

The metal-containing precursors may be any metal-containing compound that (1) is soluble or suspendable in the polyol solution, (2) will reduce to elemental metal and by products that are soluble in the reaction mixture. Typically, these precursors will have an M—O bond, where M is the metal. Typical precursors include metal acetates and hydrates thereof, metal chlorides and hydrates thereof, metal nitrates, metal oxides, metal oxalates, metal hydroxides, and acids including the desired metal as part of an oxyanion (e.g., tungstic acid) and salts of such acids (e.g., sodium tungstate and potassium hexachlorplatinate). The best precursors to use for the formation of nanostructured powders and films including any specific metal will depend upon the metal selected. Typically, to provide nanostructured materials, the precursors used in the present invention should be substantially soluble in the reaction mixture.

The two or more metals are preferably immiscible in the composition range desired.

Skilled practitioners will refer to the phase diagrams of various metal systems and recognize that, e.g., below 4 at %, Co is miscible in Cu. If a metastable solid solution is formed by the polyol process, it can be phase separated by subsequent annealing. However, one of the desired advantages of the invention is avoiding the need for such subsequent annealing. Desirable composites that may be made by the present invention include FeCu, CoCu, CoAg, FeAg, FeCoCu, and FeCoAg.

The process of the invention takes place in a liquid phase, so the polyol used in the process of the invention is a liquid at the reaction temperature. Mixtures of different polyols (including mixtures of true polyols and alcohols) may be used. Suitable polyols include primary, secondary, and tertiary alcohols, aliphatic glycols and alkylene polyesters. Preferred polyols are alkylene glycols having up to 6 carbon atoms in the main chain, and polyalkylene glycols derived therefrom. Most preferred polyols are glycerol, ethylene glycol, diethylene glycol, triethylene glycol, butanediols, and tetraethylene glycol.

After the metal precursors and solvents are selected, the precursors are mixed with the solvent. At the time of mixing, this alcoholic solvent may be either heated or unheated. Then, the resulting mixture is taken to a temperatures sufficiently high to dissolve, or allow the reaction of, the metal precursor or precursors and form precipitates of the desired metal.

The reduction step of the process of the invention typically takes place at elevated temperatures. Preferably, the reduction takes place at temperatures of at least 85° C. More preferably, the reduction takes place at temperatures between 100° C. and 350° C. Frequently, the reduction takes place at or near the boiling point of the polyol or polyol mixture. The preferred temperature depends, however, on the reaction system used.

After the desired precipitates form, the reaction mixture may be cooled either naturally (e.g., air cooling) or quenched (forced cooling). Because quenching provides greater control over the reaction time, it is preferred to air cooling. For quenching to be useful in the deposition of a conductive metal film upon a substrate, however, the substrate must and the film/substrate interface must be able to withstand rapid thermal changes. If the substrate and/or film/substrate interface cannot withstand these rapid thermal changes, then air cooling should be used. the metallic precipitate is collected.

Particularly valuable embodiments of the invention are Co—Cu nanocomposites. These composites consist of a nonmagnetic matrix containing, e.g., a single domain nanoscale particles, will typically have high coercivities and would be useful in magnetic storage. These composites also exhibit giant magnetoresistance.

For the Co—Cu system, terminal solid solutions do not exceed 5.5 at % Co in Cu and 12 at % Cu in Co. It has been reported that Co—Cu can form metastable solid solutions in the immiscible range (as used herein, the term "immiscible" refers to compositions that are in the immiscible range of their phase diagrams).

A wide range of substrates are suitable for film formation, including borosilicates, such as Pyrex™, glasses that are essentially free of borosilicates, polyimides such as Kapton™, perfluorinated polymers such as Teflon™ (poly [tetrafluoroethylene]), aluminum nitride, carbon, silicon, and alumina. The method of the present invention deposits nanocrystalline metallic films on both two dimensional substrates (flat surfaces) and three-dimensional substrates (e.g., fiber and preforms). Multilayer films are also within the scope of the present invention. For example, one could deposit a CoCu nanocomposite film on a substrate, subsequently deposit a FeCu nanocomposite film on the deposited CoCu film, and deposit a metal layer (e.g., Cu) over the deposited FeCu film. An arbitrary number of layers of nanocomposites and single metal layers, as well as alloy layers, may be deposited as desired.

EXAMPLES

Having described the invention, the following examples are given to illustrate specific applications of the invention, including the best mode now known to perform the invention. These specific examples are not intended to limit the scope of the invention described in this application.

Experimental Methods

Powders were prepared by suspending different proportions of Co (II) acetate tetrahydrate [$Co(OCCH_3)_2 \cdot 4H_2O$]

with Cu (II) acetate hydrate [Cu(OCCH$_3$)$_2$·H$_2$O] in 250 ml ethylene glycol. The proportions of respective salts used in the experiments were calculated on the basis of the target compositions of Co$_x$Cu$_{100-x}$ (x in at %). The mixtures were refluxed at 180–190° C. for 2 hours. During that time, Co—Cu particles precipitated out of solution. The particles were collected by filtration and dried. Several complementary techniques were used to characterize the powders.

Chemical compositions of as-synthesized powders were analyzed for Co and Cu using a Perkin-Elmer Plasma II Inductively coupled Plasma-Atomic Emission Spectrometer (ICP-AES). Acceptable relative standard deviations for ICP-AES were 1.5% or less. Stock plasma standards of Cu and Co (1000 mg/L, ppm) were purchased commercially (Spex). A 10.00 ppm multi-element working standard for instrument calibration was prepared by dilution of the stock solutions with Type I ASTM water for Cu and Co. Additionally, both standard and blank were treated so that the final nitric acid concentration (v/v) matrix-matched the samples to be analyzed.

The powders were examined using a θ–2θ Philips diffractometer (Cu source, K$_\alpha$ wavelength =1.5406 Å), with a diffracted beam monochromator to minimize the fluorescence problem. Diffraction profile shapes were analyzed quantitatively using a profile fitting program to obtain accurate 2θ values and full width at half maximum (FWHM) values. Line broadening at FWHM was used to estimate the average crystallite size. Lattice constants were calculated by Cohen's method.

Powders were supported on carbon coated copper TEM grids, and were studied using a JEOL 200 CX microscope and a Hitachi H9000UHR microscope operated at accelerating voltages of 200 kV and 300 kV respectively. Bright field and dark field imaging were performed to reveal the morphology of powders. Structure information was obtained using selected area electron diffraction and HRTEM lattice imaging.

Local atomic structure was investigated using EXAFS. X-ray absorption spectra encompassing the Cu K absorption edge were collected from a series of Co$_x$Cu$_{100-x}$ powder samples using the Naval Research Laboratory's materials analysis beam line, X23B, at the National Synchrotron Light Source (Brookhaven National Laboratory, Upton, N.Y.). The EXAFS spectra reveal the information of the type and number of near neighbor atoms, near neighbor distance, and the degree of ordering around the absorber atom. The extended x-ray fine structures appearing at energies of 20–600 eV above the absorption edge contain information of the local structure and chemistry around the absorbing species. The powders were uniformly distributed on Scotch Magic™ tape. All X-ray absorption spectra were collected using a transmission technique, where x-ray absorption by the sample was measured as the natural log of the ratio of the incident signal to the transmitted signal. Prior to data collection, the linearity of the detectors and their amplifiers were investigated. This was done by measuring the absorption signal above the absorption edge before and after attenuating the incident beam. A 50% reduction of the transmitted beam was achieved by attenuating the incident beam with multiple layers of commercial grade aluminum foil (0.01 inch. thick). The ratio of the transmitted to incident beam was found to vary less than 0.5% over the energy range of interest before and after attenuation indicating acceptable data collection conditions. The Cu EXAFS are free from problems due to harmonic radiation in the beam because the beam line employed has as its first optical element a collimating mirror, which does not reflect X-rays above 10.5 KeV. Following established EXAFS analysis procedures, the pre-edge background absorption was determined from a quadratic fit to the data roughly 100–50 eV below the absorption edge energy and then extrapolated over the entire range of the spectrum. The K-edge absorption was then isolated by subtracting the extrapolated pre-edge background from the post-edge absorption signal. The smoothly varying atomic absorption was determined by fitting the post-edge data with a cubic-spline function. The absorption spectra were then step-normalized by dividing by the amplitude of the absorption edge. The normalized oscillations provide local structural information, such as coordination numbers, distances, and disorder (both thermal and structural) around the absorbing atom.

Spin-echo NMR measurements were carried out on a commercially available pulsed NMR spectrometer in frequencies ranging from 90 to 320 MHz at 77 K. In NMR, the hyperfine field experienced by a nucleus strongly depends on the nature and number of atoms in the neighborhood of a nucleus, and possibly also on the symmetry of this neighborhood. The NMR signal intensity and frequency were calibrated using a pulse-modulated signal generator. The data acquisition was carried out with a time average computer. Two equal 120° pulses with lengths of 2.0 μs and a separation of 10 μs were used to obtain the $^{59}$Co NMR spectra. The measured echo amplitude was then normalized and divided by the first power of the frequency in the usual manner. Additional details concerning NMR experimental methods can be found at Y. D. Zhang, et al., J. Mag. Magn. Mat., 61 p. 162 (1986).

Powders were annealed at different temperatures between 100° C. to 650° C. in argon, and then cooled to room temperature to obtain hysterisis loops using vibrating sample magnetometry (VSM), with a maximum field of 14 KOe. The magnetic properties of as-synthesized and annealed powders provided additional information on the structure of as-synthesized materials.

Results

Chemical compositions of as-synthesized Co$_x$Cu$_{100-x}$ powders by ICP-AES analysis showed the actual wt. % of Co and Cu of these samples. The concentrations of Co and Cu did not sum to 100 wt. %. This discrepancy is believed to be caused by impurities including oxygen and carbon which are not detected by this technique. The chemical compositions of Co and Cu shown in Table 1 was calculated by normalizing their concentrations to 100 at. %, and x was found to vary between 4 and 49 at. %. It is noted that the actual ratio of Co to Cu was different from those in the starting solutions.

TABLE I

Chemical compositions of Co$_x$Cu$_{100-x}$ powders

| Solution compositions (at. %) | | Powder compositions (at. %) | |
|---|---|---|---|
| Co | Cu | Co | Cu |
| 10 | 90 | 4 | 96 |
| 20 | 80 | 19 | 81 |
| 80 | 20 | 30 | 70 |
| 90 | 10 | 49 | 51 |

Figure 1B:
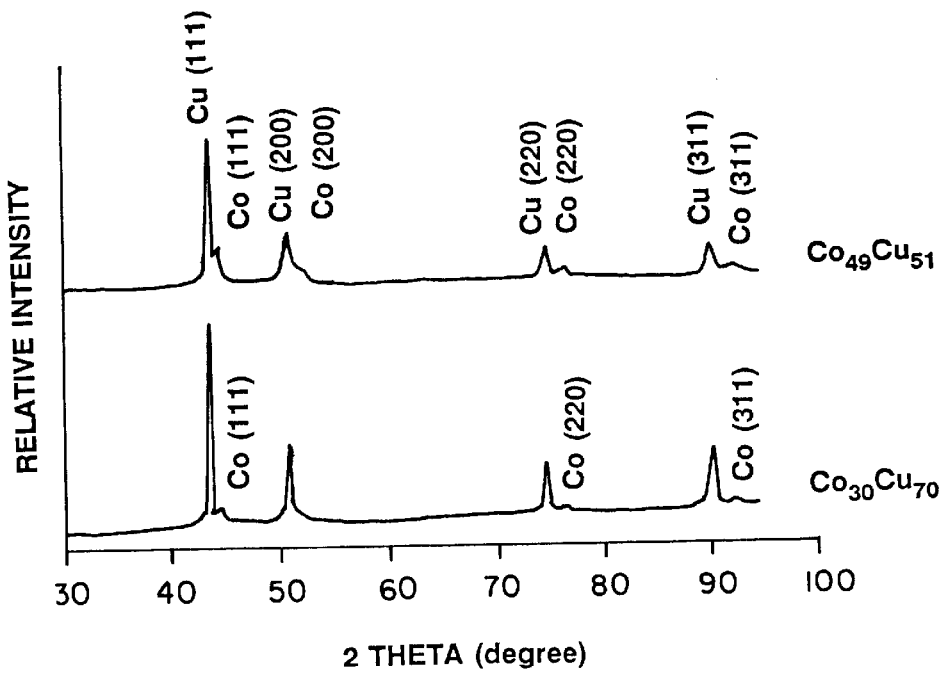

Analysis of XRD data showed that the powders were crystalline (FIGS. 1a and 1b). Diffraction peaks due to fcc Cu were detected in all samples with different Cu concentrations. Diffraction peaks due to cobalt were not detected when x=4. When x=19, a small signal corresponding to fcc Co (111) was observed. The intensity of the Co peaks increased with the concentrations of Co in the samples. The calculated lattice constants of Cu for different samples were within 0.05% of the literature value (3.6150 Å). The lattice constants for cobalt could only be obtained for x>30. They were found to be within 0.3% of the literature value (3.5447 Å). From the line broadening of the Cu (200) peaks, the crystallite size of Cu was in the range of 20 to 36 nm. The crystallite size of Co was estimated to be about 18 nm from the Co (111) peaks for samples with x>30. It is noted that hcp Co was not detected by XRD in these samples.

The morphology of as-synthesized powders of $Co_4CU_{96}$ and $Co_{49}Cu_{51}$ was shown by TEM micrographs. All the powders appeared to be agglomerated, and the agglomerate size was typically 100 nm or larger. For the $Co_4CU_{96}$ sample, selected area electron diffraction showed a spotty polycrystalline pattern which could be assigned to fcc Cu. Diffraction spots or rings due to Co were not detected in this sample. Dark field imaging revealed that the agglomerate was made up of primary crystallites with size approximately 20–30 nm. The selected area aperture used in this study was not small enough to isolate the Cu (111) diffraction ring from that of Co (111) for dark field imaging. However, lattice imaging of these samples using HRTEM revealed the Cu (111) fringes.

Figure 2A:
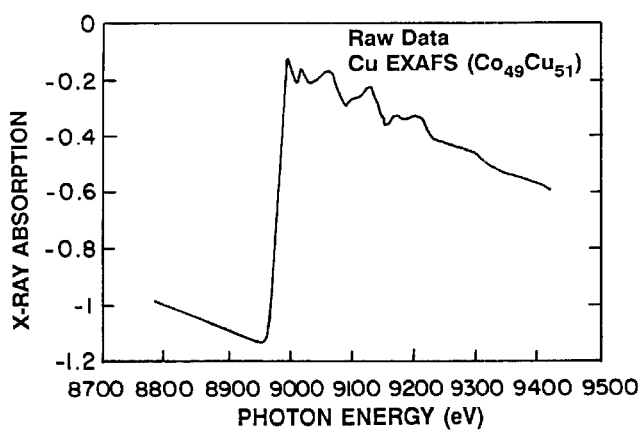
FIGS. 2a, 2b, 2c, 2d, and 2e show EXAFS data of the Cu edge of $Co_{49}Cu_{51}$.
Figure 2B:
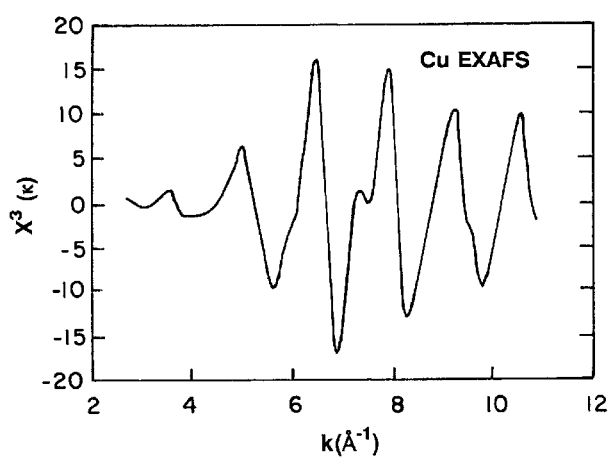
Figure 2C:
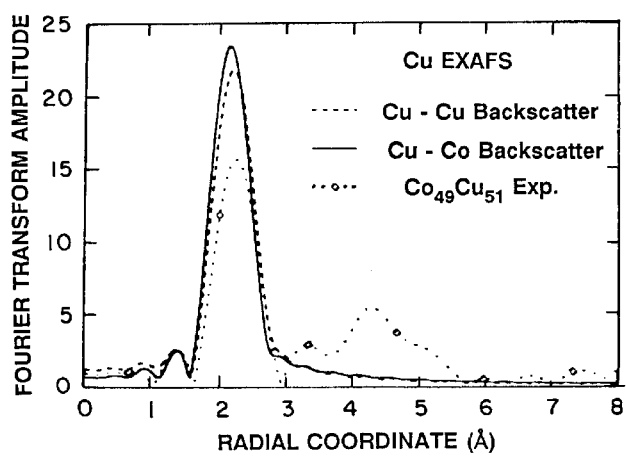

The raw EXAFS data and normalized EXAFS c(k) data (where k is the photoelectron wave number) for the $Co_{48}Cu_{51}$ sample are shown in FIGS. 2a and 2b. These data were Fourier-transformed to real space (r) to allow inspection of the data in radial coordinates and the correlation of Fourier peaks to atomic positions within the unit cell. These data are affected by an electron phase shift and hence the Fourier peaks do not correspond to the true bond distance of the near neighbor but instead are offset to lower distances. The corresponding Fourier transform for this data is shown in FIG. 2c. A Modified Hanning window function of 0.25 $Å^{-1}$ was used at both the upper and lower transform bounds to suppress truncation ripple. In order to obtain quantitative information of the Cu atom's near neighbor environment, the r-space transformed data were inverse-transformed over the first-shell spectral range between 1.3 Å and 3.1 Å. In this instance, a Modified Hanning window function of 0.35 $Å^{-1}$ was used to suppress truncation ripple.

Figure 2D:
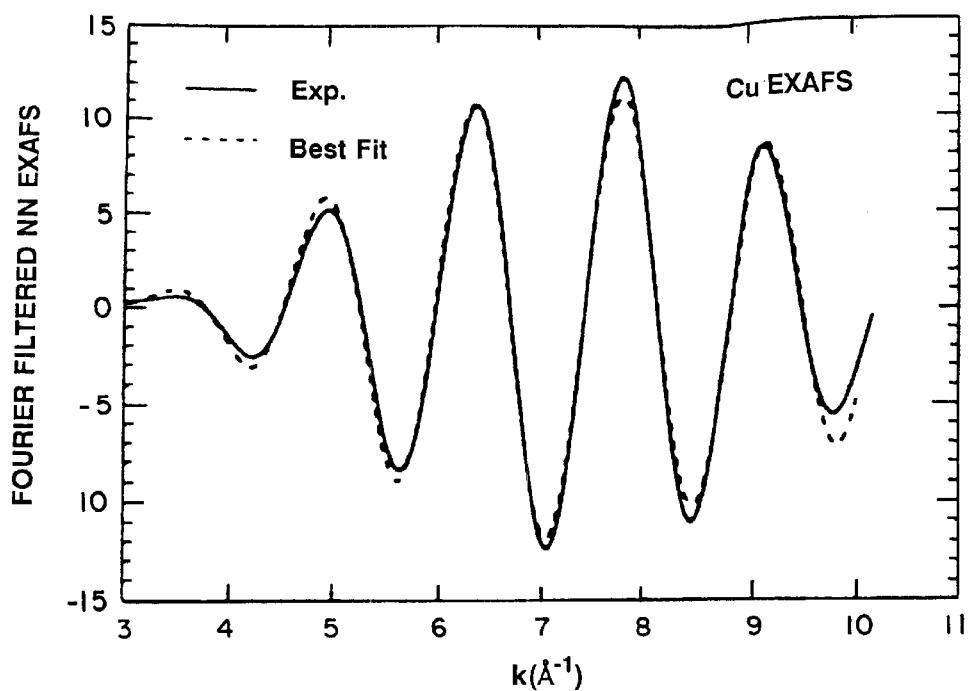
Figure 2E:
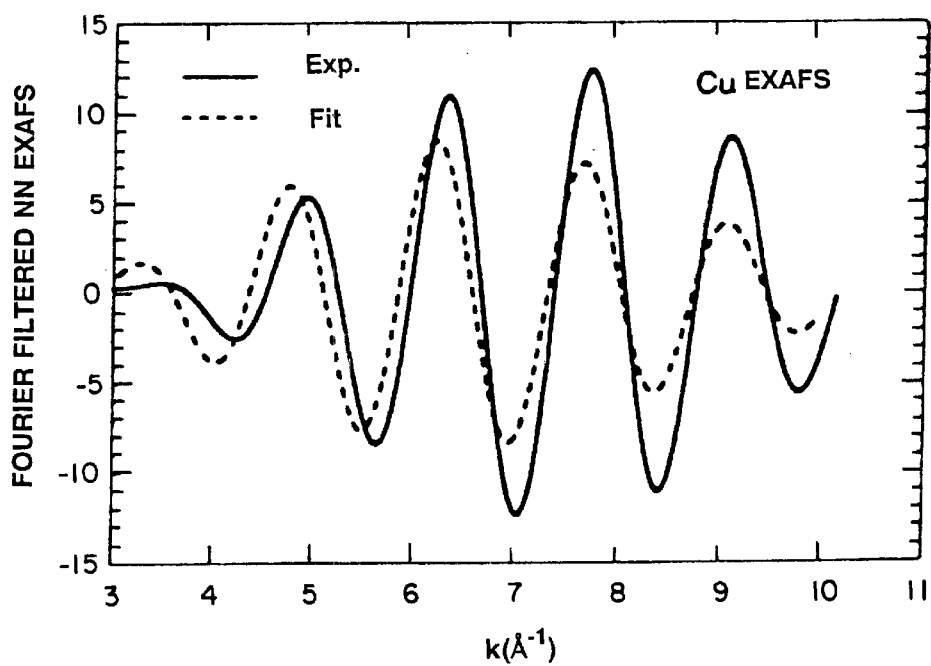

Whenever the possibility exists that there are more than one atomic species contained in one coordination shell, nonlinear least-squares fitting is necessary. While fitting this particular data, a combination of the two theoretically generated FEFF3 XAFS standards (Cu with a Co backscatterer and Cu with a Cu backscatterer) were used to recreate the filtered data representing this sample. See J. J. Rehr et al., J. Am. Chem. Soc. 113, 5135 (1991). During the fitting procedure, three parameters for each of the two standards were allowed to vary: coordination number (N), coordination distance (R), and mean-square disorder ($s^2$). The smallest Fourier-transform and inverse transform ranges used during the analysis were 7 $Å^{-1}$ and 1.8 Å respectively. For these conditions, the maximum number of fit parameters allowed to vary at one time was 8. Therefore, it was permitted to "float" 6 variables during the fit. The best fitting parameters were obtained by minimizing the difference in phase and amplitude of the filtered data of the unknown and the computer-generated combination of the Cu—Co and Cu—Cu standards. The XAFS coordination results from this fitting analysis indicated that there was very little to no alloying of the Co and Cu in this sample. FIG. 2d shows the experimental filtered data for the $Co_{49}Cu_{51}$ sample and the computer-generated best fit. Results from this fit indicated 11±2 Cu nearest neighbors at a radial distance of 2.55 Å and 0±1.5 Co nearest neighbors. FIG. 2e shows the experimental filtered data for the same sample and what the XAFS computer-generated fit would look like if there were homogeneous alloying of that sample (i.e. 6 Cu and 6 Co backscatterers in the Cu first shell).

Figure 3A:
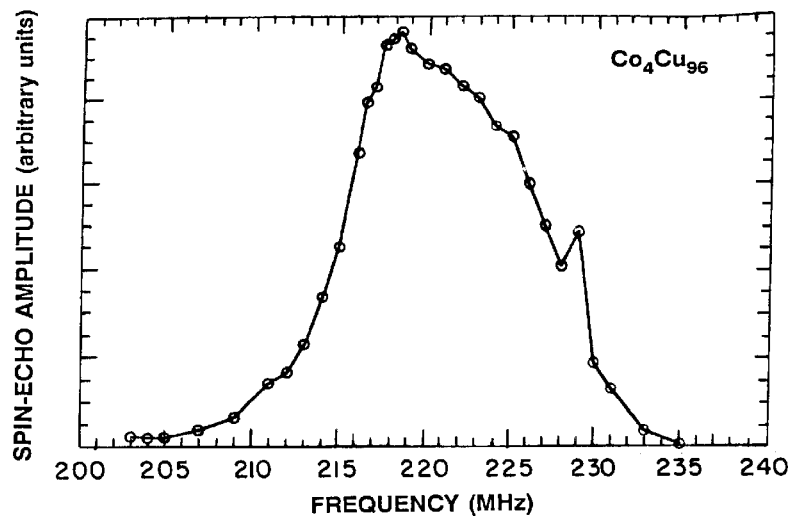
FIGS. 3a, 3b, and 3c show NMR data for Co—Cu powders.
Figure 3B:
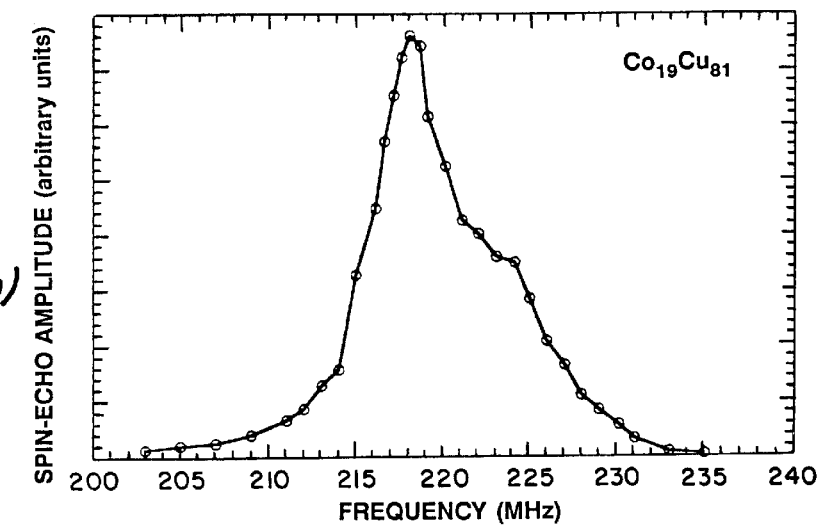
Figure 3C:
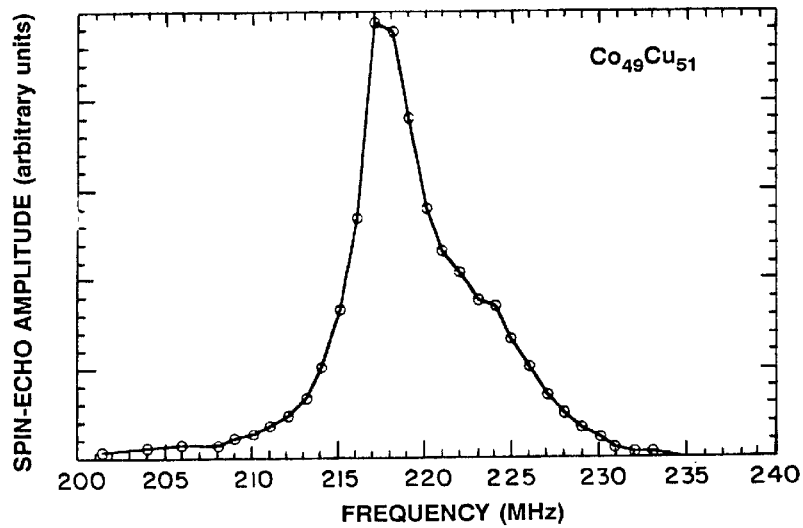

$^{59}Co$ spin-echo NMR spectra for the $Co_xCu_{100-x}$ samples with x=4, 19, and 49 are shown in FIGS. 3a–3c. These spectra had a similar feature in that there was a strong peak centered at 217 MHz and a broad shoulder in its high frequency side with a small peak around 224–226 MHz. In addition, the spectra were very broad overall compared with the spectrum of pure Co metal. The NMR frequency is very sensitive to local atomic environments. For fcc and hcp Co, the NMR frequencies are 217 and 228 MHz, respectively, with line widths less than 1 MHz. The 217 MHz peak shown in FIGS. 3a–3c was ascribed to fcc Co for which each Co atom was surrounded by 12 nearest Co neighbors. It is known that for fcc Co, the replacement of one nearest neighbor Co atom by a Cu atom reduces the NMR frequency by about 16 MHz. If the $Co_xCu_{100-x}$ system formed alloys in which the Co and Cu atoms were randomly distributed, we would expect a $^{59}Co$ NMR spectrum with much less intensity at 217 MHz with some satellites approximately around 200, 186 MHz, or a broadened resonance on the lower frequency (<217 MHz) side. However, this was not the case for our samples. The strong 217 MHz peak and the absence of low frequency resonances all indicated that the Co atoms existed as clusters rather than in a Co—Cu solid solution. It is likely that the shoulder at the high frequency (>217 MHz) range was contributed from the Co atoms in the surface regions of the Co clusters. The satellites which appeared on the high frequency side were due to either hcp Co grains or hcp stacking faults in fcc Co.

Figure 4A:
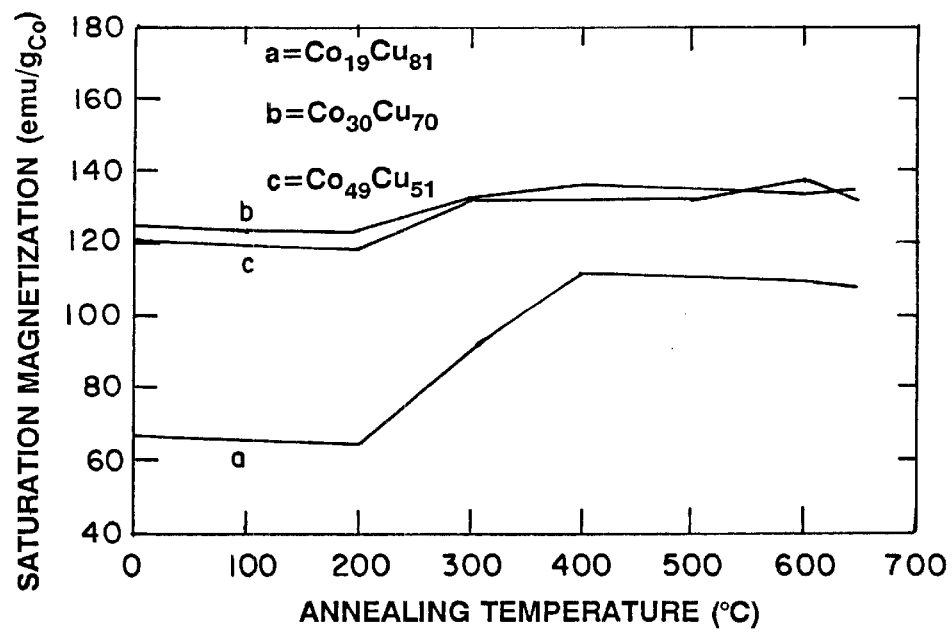
FIGS. 4a and 4b show magnetic data for Co—Cu powders.
Figure 4B:
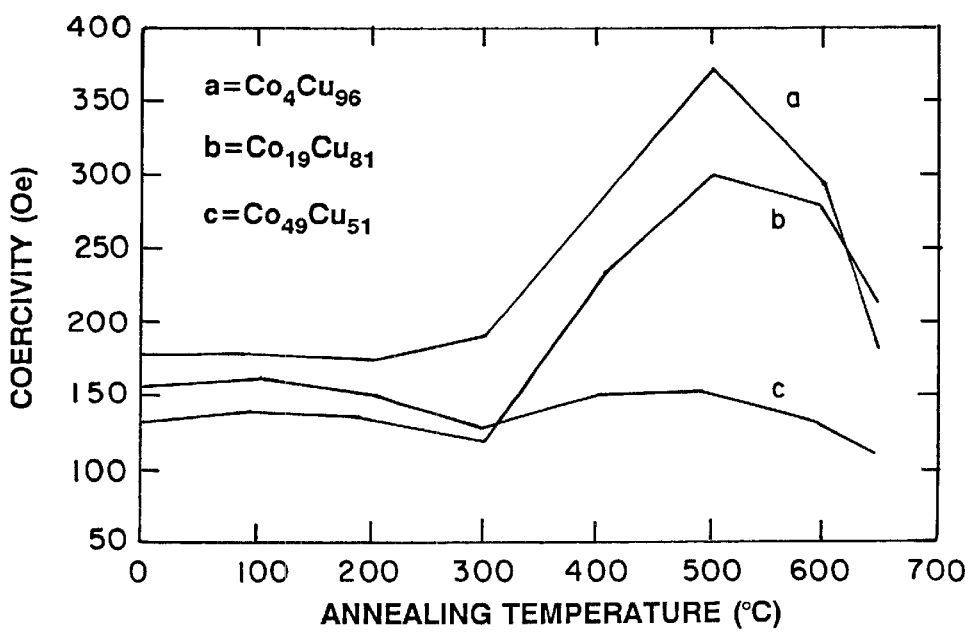

The magnetic properties of the powders as a function of annealing temperature are shown in FIGS. 4a and 4b. The saturation magnetization ($M_s$) of as-synthesized powders with lower Co concentrations was much lower than those with higher Co content (FIG. 4a). Upon increasing the annealing temperature, there was an increase in magnetization for samples with lower Co concentrations. The increase in $M_s$ could be due to either precipitation of Co from a metastable Co—Cu alloy or from the grain growth of superparamagnetic Co. Since HRTEM, NMR, and EXAFS results of as-synthesized samples showed that alloying did not occur, the increase in Ms by annealing was attributed to the grain growth of Co clusters. Note that the Ms of bulk Co is 175 emu/g for fcc Co and 162 emu/g for hcp Co respectively. In all samples the cobalt particles did not reach the saturation magnetization of bulk Co. The lower saturation magnetization of phase separated Co—Cu films was also observed by others when the as-sputtered films were annealed. It is noted that the largest available field used in this investigation was 14 KOe, thus it is possible that complete magnetic saturation of Co in these samples was not achieved.

The percolation threshold of granular materials occurs where x≈50%. Near the percolation threshold of Co, it was observed that $M_s$ of the $Co_{49}Cu_{51}$ sample did not show a marked increase with increasing annealing temperature. This agreed with that observed for Co—Cu samples with similar compositions obtained by annealing the sputtered metastable alloy film. The room temperature coercivity of the powders with lower Co contents also increased with annealing temperature, reached a maximum (e.g., 370 Oe for the $Co_4CU_{96}$ sample) and then decreased with further increasing temperature as a result of grain growth (FIG. 4b). The $Co_{49}Cu_{51}$ sample did not show any increase in coercivity as the temperature increased. This can be explained by the existence of clustering of nanoscale Co particles which were magnetically interacting with one another. It was reported that as-sputtered metastable alloy film of $Co_{45}Cu_{55}$ was a soft ferromagnet with a coercivity of about 15 Oe. The coercivity of our as-synthesized sample of $Co_{49}Cu_{51}$ was about 150 Oe and decreased to about 110 Oe at 650° C. The coercivity of the as-synthesized $Co_4CU_{96}$ sample was even higher (i.e. 175 Oe). These magnetic results indicated that as-synthesized Co—Cu powders in the above composition range were nanocomposites rather than metastable solid solutions. It should be pointed out that alloying did not occur even in the case of the compositions where terminal solid solutions can exist, as supported by the high coercivity of as-synthesized $Co_4Cu_{96}$ sample.

Detailed studies using complementary characterization techniques such as XRD, HRTEM, EXAFS, NMR and VSM clearly showed that alloying of Co and Cu did not occur. The as-synthesized Co—Cu powders existed as nanocomposites.

Chemical analysis of as-synthesized samples provided an insight into the formation of these Co—Cu nanocomposite powders. The ICP-AES results showed that there was a discrepancy between the nominal solution compositions and the actual compositions of powders. This discrepancy was particularly significant for samples prepared with high nominal Co contents. As seen in Table I, the powders synthesized using a nominal composition of $Co_{90}Cu_{10}$ had an actual composition of $Co_{49}Cu_{51}$. These data suggested that Co was less reducible than Cu, which is also consistent with the electrochemistry of Co and Cu. We had also performed experiments to make single-element powders of Cu and Co separately using the polyol method. It was found that under the same synthesis conditions, Co was much more difficult to form than Cu. Thus it is inferred that Cu, being more easily reducible, nucleated first and grew to form nanocrystallites. These Cu nanocrystals subsequently served as nuclei upon which the less reducible Co formed. This explanation also agreed with observations that the reduction of $Co(OH)_2$ to form Co particles in the polyol process was aided by either in-situ formation of foreign Ag nuclei, obtained by adding a small amount of silver nitrate, or by addition of Pd nuclei in the polyol. Since the samples were prepared at temperatures near that where clustering of Co started to occur in the metastable Co—Cu system, the possibility of formation of a metastable alloy was further reduced.

Bulk Co has a hcp structure below 417° C. Above this temperature, it has a fcc structure. Formation of fcc Co in a Co—Cu sputtered film and chemically prepared powders was observed when the as-synthesized materials were annealed. The fcc structure of Co could be retained since the change in free energy for the transformation of fcc to hcp structure estimated from the transition temperature is about 100 cal/g-atom, and this allotropic transformation is sluggish particularly for fine crystals of cobalt. When the Co powders were prepared alone using the polyol method at a higher temperature of 220° C., it was found that Co had a predominantly metastable fcc structure. When the Co—Cu nanocomposite powders were synthesized at 190° C. by this polyol method, the structure of Co as revealed by XRD, HRTEM, and NMR also showed the fcc stacking of Co. In addition, the NMR data revealed that some hcp Co or hcp stacking faults of fcc Co existed in these samples. The formation of the metastable fcc structure of Co below the phase transformation temperature in these nanocomposites can be explained by Co nucleating on the already formed Cu particles. At this interface, fcc Cu could stabilize the fcc structure of Co in the nanocomposite. A similar observation was also reported in the structural study of Co—Cu multilayers by NMR, when the multilayers with small Co thickness had a pure fcc Co structure. With increasing Co thickness, the more stable hcp Co phase developed. It was suggested that Cu stabilized the fcc structure since the proportion of hcp Co decreased with increasing Cu thickness. The NMR results of our samples showed that the proportion of hcp Co seemed to increase with increasing Cu concentration. This increase of relative intensity of hcp Co suggested that the size of Co clusters decreased with reducing Co content (which also agreed with the XRD and magnetic results). It is suggested that hcp stacking faults of fcc Co predominantly occurred on the surface of the particle. As the amount of surfaces increased with decreasing particle size of Co, the concentration of hcp stacking faults of fcc Co also increased.

The Co—Cu nanocomposite powders consisted of primary nanoscale crystallites of Co and Cu which agglomerated to form large secondary particles. Fine particles have a significant amount of surface compared to their counterparts of larger size. Because of the van der Waals attractive forces between fine particles and the resulting favorable reduction of the free energy of the system, these colloidal particles tend to agglomerate unless stabilized by other forces. The TEM results showed that the particles did not have a narrow size distribution. Thus it can be inferred that nucleation of neither Cu nor Co occurred as a single event, and this resulted in a size distribution of nuclei. This in turn led to a size distribution of particles due to the Ostwald ripening process driven by the reduction of interfacial free energy.

Obviously, many modifications and variations of the present invention are possible in light of the above teachings. It is therefore to be understood that, within the scope of the appended claims, the invention may be practiced otherwise than as specifically described.

What is claimed is:

1. A method for making a metal powder comprising a nanoscale composite of at least two immiscible metals, comprising the steps:

dissolving or suspending at least two metal compounds in a polyol, thereby forming a solution or suspension, wherein said metal compounds are each soluble or suspendable in polyol solution and wherein said metal compounds each reduce to elemental metal and by products that are soluble in said solution or suspension;

adjusting the temperature of said solution or suspension to a reduction temperature, thereby initiating the reduction of said metal compounds and the precipitation of metal particles from said solution or suspension.

2. The method of claim 1, wherein said polyol is selected from the group consisting of aliphatic glycols and alkylene polyesters.

3. The method of claim 1, wherein said polyol is an alkylene glycol having up to 6 carbon atoms in the main chain.

4. The method of claim 1, wherein said polyol is a polyalkylene glycol derived from an alkylene glycol having up to 6 carbon atoms in the main chain.

5. The method of claim 1, wherein said polyol is selected from the group consisting of glycerol, ethylene glycol, diethylene glycol, triethylene glycol, butanediol, and tetraethylene glycol.

6. The method of claim 1, wherein said step of adjusting the temperature of said solution or dispersion comprises heating said solution or dispersion.

7. The method of claim 6, wherein said step of heating said solution or dispersion comprises heating to at least 85° C.

8. The method of claim 6, wherein said step of heating said solution or dispersion comprises heating to a maximum temperature between 100° C. and 350° C.

9. The method of claim 6, wherein said step of heating said solution or dispersion comprises boiling said solution or dispersion.

10. The method of claim 1, wherein said metal compounds each contain an M—O bond, wherein M represents each of said metals.

11. The method of claim 1, wherein said metal compounds are selected from the group consisting of metal acetates, hydrates of metal acetates, metal chlorides, hydrates of metal chlorides, metal nitrates, metal oxides, metal oxalates, metal hydroxides, acids having said metal as part of an oxyanion, and salts of acids having said metal as part of an oxyanion.

12. The method of claim 11, wherein said metal compounds are selected from the group consisting of sodium tungstate, potassium hexachlorplatinate, and tungstic acid.

13. A method for making a metal layer on a substrate, said metal layer comprising a nanoscale composite of at least two immiscible metals, comprising the steps:
dissolving or suspending at least two metal compounds in a polyol, thereby forming a solution or suspension, wherein said metal compounds are each soluble or suspendable in polyol solution and wherein said metal compounds each reduce to elemental metal and by products that are soluble in said solution or suspension;
disposing said substrate in said solution or suspension;
adjusting the temperature of said solution or suspension to a reduction temperature, thereby initiating the reduction of said metal compounds and the precipitation of metal particles from said solution or suspension.

14. The method of claim 13, wherein said polyol is selected from the group consisting of aliphatic glycols and alkylene polyesters.

15. The method of claim 13, wherein said polyol is an alkylene glycol having up to 6 carbon atoms in the main chain.

16. The method of claim 13, wherein said polyol is a polyalkylene glycol derived from an alkylene glycol having up to 6 carbon atoms in the main chain.

17. The method of claim 13, wherein said polyol is selected from the group consisting of glycerol, ethylene glycol, diethylene glycol, triethylene glycol, butanediol, and tetraethylene glycol.

18. The method of claim 13, wherein said step of adjusting the temperature of said solution or dispersion comprises heating said solution or dispersion.

19. The method of claim 18, wherein said step of heating said solution or dispersion comprises heating to at least 85° C.

20. The method of claim 18, wherein said step of heating said solution or dispersion comprises heating to a maximum temperature between 100° C. and 350° C.

21. The method of claim 18, wherein said step of heating said solution or dispersion comprises boiling said solution or dispersion.

22. The method of claim 13, wherein said metal compounds each contain an M—O bond, wherein M represents each of said metals.

23. The method of claim 13, wherein said metal compounds are selected from the group consisting of metal acetates, hydrates of metal acetates, metal chlorides, hydrates of metal chlorides, metal nitrates, metal oxides, metal oxalates, metal hydroxides, acids having said metal as part of an oxyanion, and salts of acids having said metal as part of an oxyanion.

24. The method of claim 13, wherein said metal compounds are selected from the group consisting of sodium tungstate, potassium hexachlorplatinate, and tungstic acid.

25. The method of claim 1, wherein said precipitated metal particles comprise said nanoscale composite of said at least two immiscible metals.

26. The method of claim 13, wherein said precipitated metal particles comprise said nanoscale composite of said at least two immiscible metals.

* * * * *